No. 637,307. Patented Nov. 21, 1899.
G. X. WENDLING & O. W. CRAWFORD.
LUMBER DRIER.
(Application filed Apr. 25, 1899.)
(No Model.) 2 Sheets—Sheet 1.
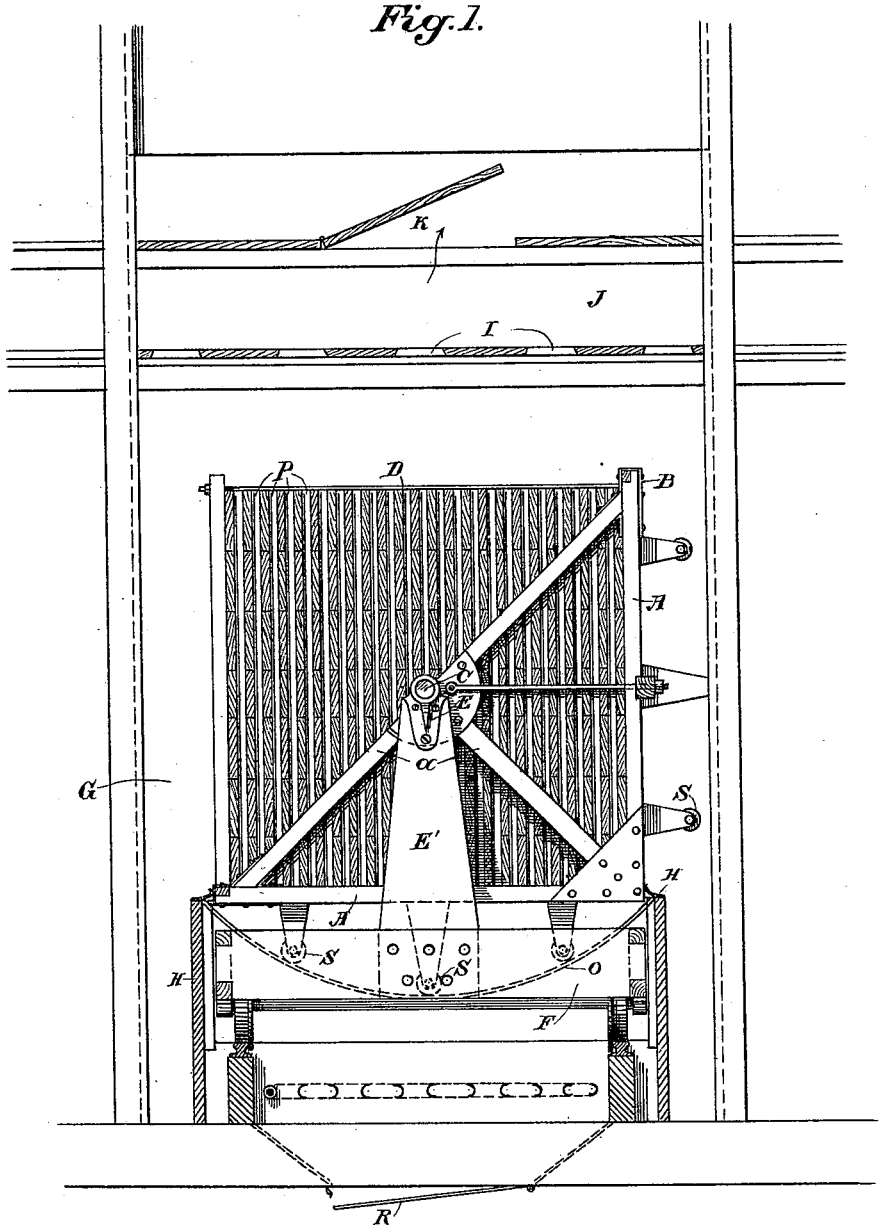

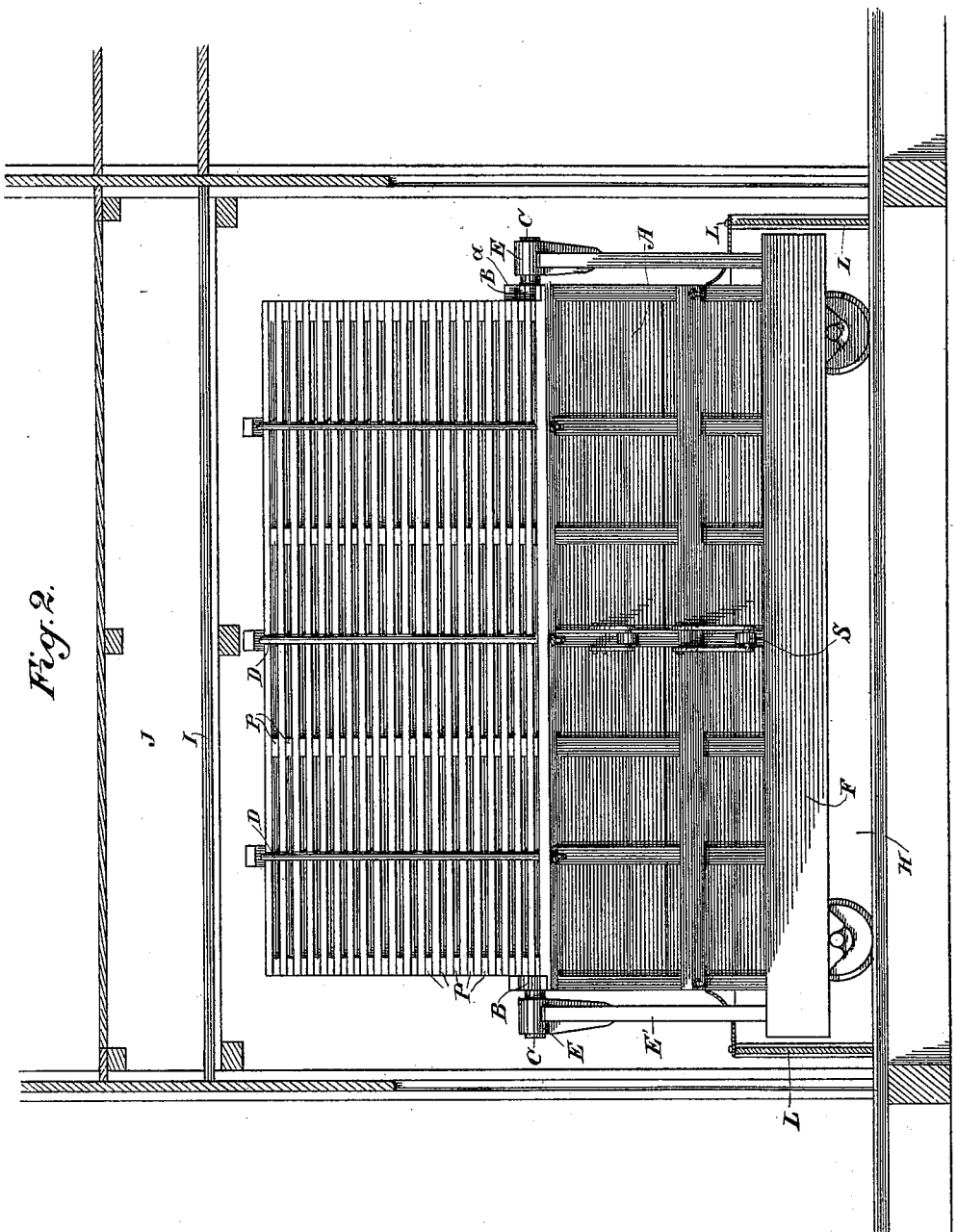

UNITED STATES PATENT OFFICE.

GEORGE X. WENDLING AND ORLIN W. CRAWFORD, OF SAN FRANCISCO, CALIFORNIA.

LUMBER-DRIER.

SPECIFICATION forming part of Letters Patent No. 637,307, dated November 21, 1899.

Application filed April 25, 1899. Serial No. 714,386. (No model.)

*To all whom it may concern:*

Be it known that we, GEORGE X. WENDLING and ORLIN W. CRAWFORD, citizens of the United States, residing in the city and county of San Francisco, State of California, have invented an Improvement in Lumber-Driers; and we hereby declare the following to be a full, clear, and exact description of the same.

Our invention relates to an apparatus which is especially designed for the drying of lumber and like articles.

It consists, essentially, in a means for stacking the lumber in such a manner that the heat passages or flues are formed within the body of lumber thus stacked, so that the heat may be passed directly therethrough. In conjunction with this is a truck having a swinging framework adapted to receive and hold the lumber and so journaled to the truck that it may be turned into one position for the purpose of loading and afterward turned to the position which the lumber is to occupy while being dried. Means are provided within the kiln whereby the heat is directed through the passages in the stack and means whereby the direction of the draft may be varied and regulated, so as to insure every part of the stack being reached by it.

Our invention also comprises details of construction, which will be more fully explained by reference to the accompanying drawings, in which—

Figure 1 is a front view of drier ready for use. Fig. 2 is a side elevation of the same, the frame being half-way tilted.

In carrying out our invention we make use of a frame A, consisting of two sides arranged at a right angle to each other. These sides are formed of an open framework in order that heated air may pass freely through them, and they may be of any size desired and of any suitable material. These two sides are rigidly secured together at their meeting edges in any well-known manner. Their outer edges are also connected by a diagonally-extending brace or braces arranged at each end, and to give further rigidity and strength to the frame another brace extends from the angle formed at the junction of the two sides to the longitudinal center of the diagonal brace. In the drawings these braces are indicated by *a*. At their junction they are rigidly connected to a socket or the plates B, and these plates are provided with journals C, which form the axis about which the frame may turn. The journals C are supported in suitable bearings at E, and for convenience in introducing the lumber into the drying-chamber and removing it therefrom these bearings E will preferably be mounted upon standards E', carried by a car F, the latter being adapted to run upon rails leading into the drying-chamber G, which latter may have steam-pipes or other heating devices arranged between the tracks and also suitable devices for admitting air below the truck to be heated by the steam-pipes or other heating medium. A damper R is shown as the means for controlling the admission of air. In order to confine the heated air in such manner that all or nearly all of it must necessarily pass through the flues formed in the stack of lumber, side boards H are provided extending upwardly from the floor of the chamber G upon each side of the car, so that when the car is properly placed in the chamber the boards H inclose the sides of the car and gates L, removably fitted between the boards H, will inclose the ends of the car, and the greater portion of the heated air must therefore necessarily pass upward through the stack of lumber. Suitable passages I are formed in the top of the chamber G and are provided with gates or dampers so arranged that any one or more of them may be opened to allow the air after passing through the stack of lumber to escape into an upper chamber J, from which it finally escapes through a flue or passage K. By providing a number of escape-passages I the heated air may be directed so as to pass through any portion of the stack of lumber, thus insuring a thorough drying of all parts of the stack.

The chamber G does not act as a kiln in the sense of receiving the body of heated air to surround the lumber, but is simply an inclosing chamber to receive the car and the air-heating devices.

In the event the lumber to be dried is heavy it may be necessary to provide supports for the frame A in addition to the journals C, and to this end we have shown the frame provided with a series of wheels S on each of its sides, adapted to run on curved tracks O on the car, said tracks having a radius from the axial center of the journals C.

In operation the lumber to be dried will be put upon the frame A outside the chamber G, and, assuming such lumber to be in the form of boards, such boards will be laid flatwise in superposed layers upon the horizontal side of the frame A and thin strips P be placed between the superposed layers. Preferably the layers will extend to the height of the vertical side of the frame and the stack will be substantially rectangular and have a series of horizontally-arranged flues between the layers. When the stack has been completed, it will be locked in place by a series of bars or rods D, extending across the stack on the sides opposite those occupied by the sides of the frame A. These bars or rods will be detachably connected in any suitable manner to the edges of the sides of the frame A and to each other, and the stack will thus be firmly locked to the frame A, which may now be turned to bring the flues in the stack from a horizontal to a vertical position. The car will then be run into the chamber G, the boards H and J be adjusted in position about it, and the operation of drying can then begin.

The term "lumber" as herein used is intended to cover any and all lumber products, and in stacking the lumber it may not always be necessary to use strips P to form the flues. However it may be stacked it will be necessary to form flues, and during the drying process these flues should extend vertically.

It is of course to be understood that if for any reason it is found desirable to reverse the lumber, so that the air current should pass through from the opposite side, the frame can be turned upon its journals, and any tendency to dry faster at one point than another can be checked.

Having thus described the invention, we claim—

1. A device for drying lumber, consisting of a frame whose sides are open for the passage of air and which forms a support for the stack of lumber to be dried, said frame being supported to turn about a horizontal axis, substantially as and for the purpose set forth.

2. A support for a stack of lumber, consisting of a frame supported to turn about a horizontal axis, said frame comprising two sides extending at a right angle from each other and open for the passage of air, said sides being rigidly secured together at their meeting edges, and their outer edges connected by diagonally-extending braces, substantially as and for the purpose set forth.

3. A support for a stack of lumber, consisting of a frame supported to turn about a horizontal axis, said frame comprising two sides extending from each other at a right angle and formed of open framework, said sides being rigidly connected and braced together, and a series of tie-rods detachably connected to the outer edges of the frame sides and to each other, said rods supporting the stack on sides opposite those supported by the sides of the frame, substantially as set forth.

4. In an apparatus for drying lumber, an inclosing chamber, a heating medium within the chamber, a movable car within the chamber above the heating medium, a support for a stack of lumber mounted upon the car to turn about a horizontal axis, said frame having open-work sides, and boards or plates H and L, removably supported to inclose the sides and ends of the car, substantially as and for the purpose specified.

In witness whereof we have hereunto set our hands.

GEORGE X. WENDLING.
ORLIN W. CRAWFORD.

Witnesses:
S. H. NOURSE,
JESSIE C. BRODIE.